United States Patent
Cairns et al.

(10) Patent No.: US 8,295,329 B2
(45) Date of Patent: Oct. 23, 2012

(54) EFFICIENT COMPUTATION OF SOFT SCALING FACTORS FOR LINEAR MULTI-USER DETECTOR

(75) Inventors: Douglas A. Cairns, Durham, NC (US); Gregory E. Bottomley, Cary, NC (US); Karl J. Molnar, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1214 days.

(21) Appl. No.: 11/850,837

(22) Filed: Sep. 6, 2007

(65) Prior Publication Data

US 2008/0267262 A1 Oct. 30, 2008

Related U.S. Application Data

(63) Continuation-in-part of application No. 11/739,126, filed on Apr. 24, 2007.

(51) Int. Cl.
*H04B 1/00* (2006.01)

(52) U.S. Cl. ........ 375/148; 375/340; 375/260; 375/267; 455/423; 455/296

(58) Field of Classification Search ............... 375/340, 375/260, 267, 148; 455/423, 296
See application file for complete search history.

(56) References Cited

U.S. PATENT DOCUMENTS

| | | | | |
|---|---|---|---|---|
| 6,067,293 A | * | 5/2000 | Shoji | 370/342 |
| 7,302,018 B2 | * | 11/2007 | Onggosanusi et al. | 375/340 |
| 2004/0033791 A1 | * | 2/2004 | Schmidl et al. | 455/137 |
| 2004/0170233 A1 | * | 9/2004 | Onggosanusi et al. | 375/340 |
| 2004/0242179 A1 | * | 12/2004 | Onggosanusi et al. | 455/296 |
| 2005/0111528 A1 | * | 5/2005 | Fulghum et al. | 375/148 |
| 2005/0195889 A1 | * | 9/2005 | Grant et al. | 375/148 |
| 2006/0029124 A1 | * | 2/2006 | Grant et al. | 375/148 |
| 2006/0079221 A1 | * | 4/2006 | Grant et al. | 455/423 |
| 2006/0159160 A1 | * | 7/2006 | Kim et al. | 375/148 |
| 2008/0130719 A1 | * | 6/2008 | Bottomley et al. | 375/148 |

OTHER PUBLICATIONS

Klein, et al., Zero Forcing and Minimum Mean-Square-Error Equalization for Multiuser Detection in Code-Division Multiple-Access Channels, Vehicular Technology, IEEE Transactions, vol. 45, No. 2, pp. 276-287, May 1996, section III-B.

Grant et al., Generalized RAKE Receivers for MIMO Systems, Vehicular Technology Conference, 2003, VTC 2003-Fall, 2003 IEEE 5th, vol. 1, pp. 424-428, Oct. 6-9, 2003, section IV.

Juntti et al., Finite Memory-Length Linear Multiuser Detection for Asynchronous CDMA Communications, Communications, IEEE Transactions, vol. 45, No. 5, pp. 611-622, May 1997, section II.

S. Verdu, "Multiuser Detection," Cambridge, UK; Cambridge University Press, 1998, pp. 291-295.

(Continued)

*Primary Examiner* — Lihong Yu
(74) *Attorney, Agent, or Firm* — Coats & Bennett, P.L.L.C.

(57) ABSTRACT

A symbol detector converts initial symbol estimates of received symbols to soft estimates for decoding. The symbol detector computes spreading waveform correlations between a spreading waveform for a symbol of interest and spreading waveforms for one or more interfering symbols. Interference rejection terms are computed by scaling the spreading waveform correlations by corresponding signal powers and compensating for noise. A soft scaling factor for the symbol of interest is computed from the interference rejection terms. The soft scaling factors are then applied to the initial symbol estimates to generate the soft estimates.

14 Claims, 6 Drawing Sheets

OTHER PUBLICATIONS

X. Wang and H.V. Poor, "Iterative (Turbo) Soft Interference Cancellation and Decoding for Coded CDMA," IEEE Trans. Comm., vol. 47, No. 7, Jul. 1999, pp. 1046-1061.

M. Rupf, F. Tarköy, and J. L. Massey, "User-Separating Demodulation for Code-Division Multiple-Access Systems,", IEEE Journal on Selected Areas in Communications, vol. 12, No. 5, Jun. 1994, pp. 786-795.

L. Ping, "Approximate MMSE-APP Estimation for Linear Systems with Binary Inputs," IEEE Communications Letters, vol. 9, No. 2, Feb. 2005, pp. 172-174.

G. Bolum, C. Van Load, Matrix Computations—Third Edition, Baltimore, MD: Johns Hopkins University Press, 1996, pp. 520-529.

* cited by examiner

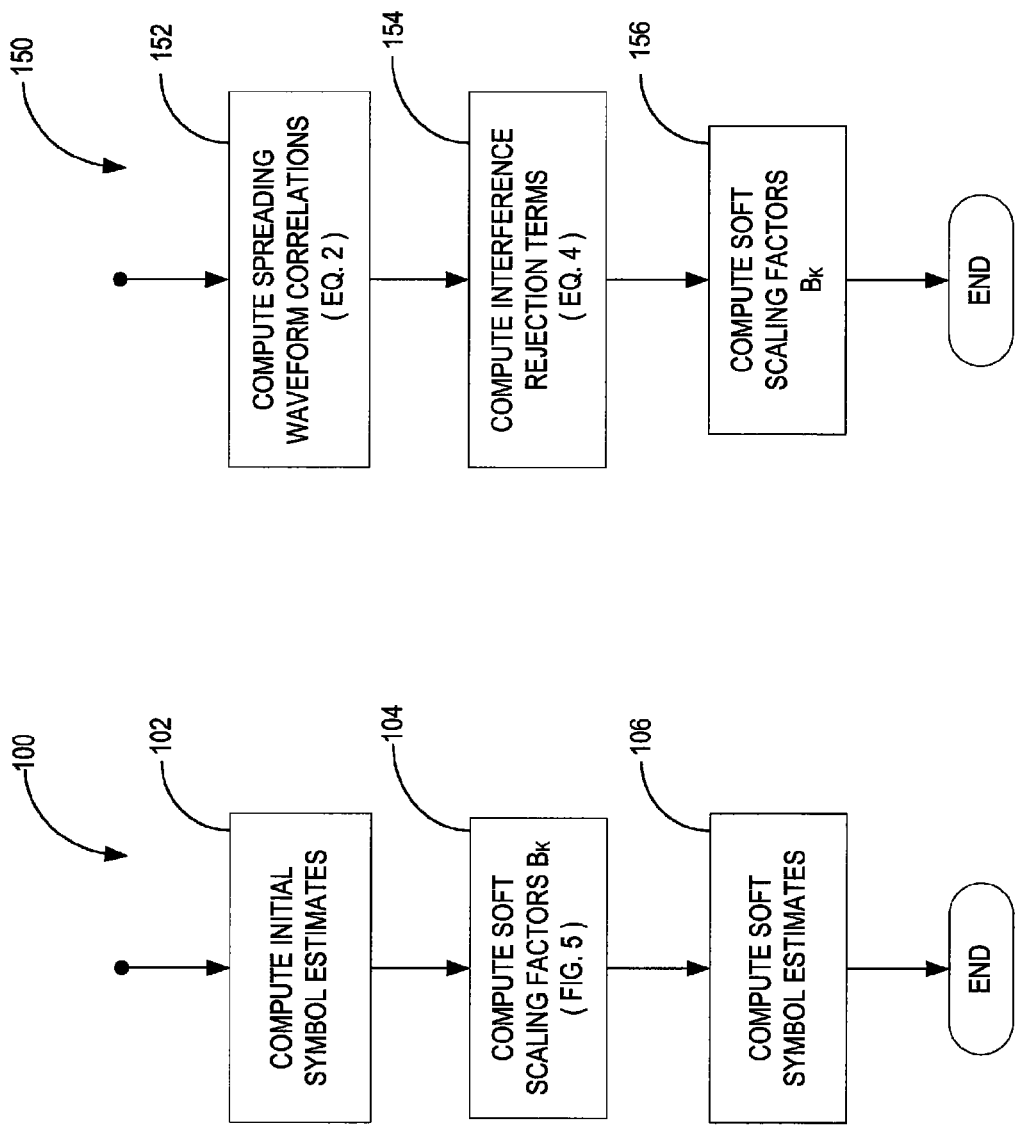

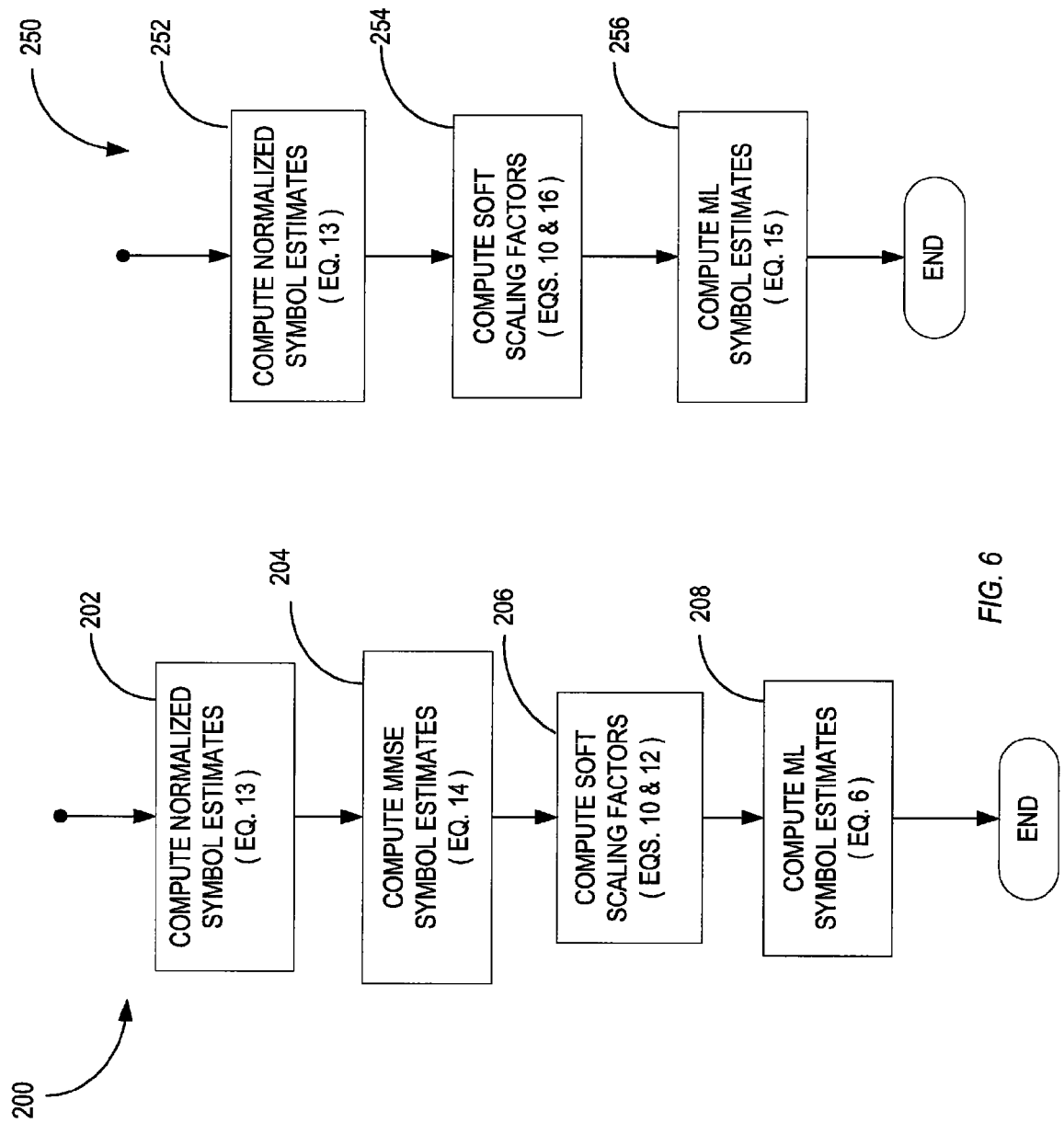

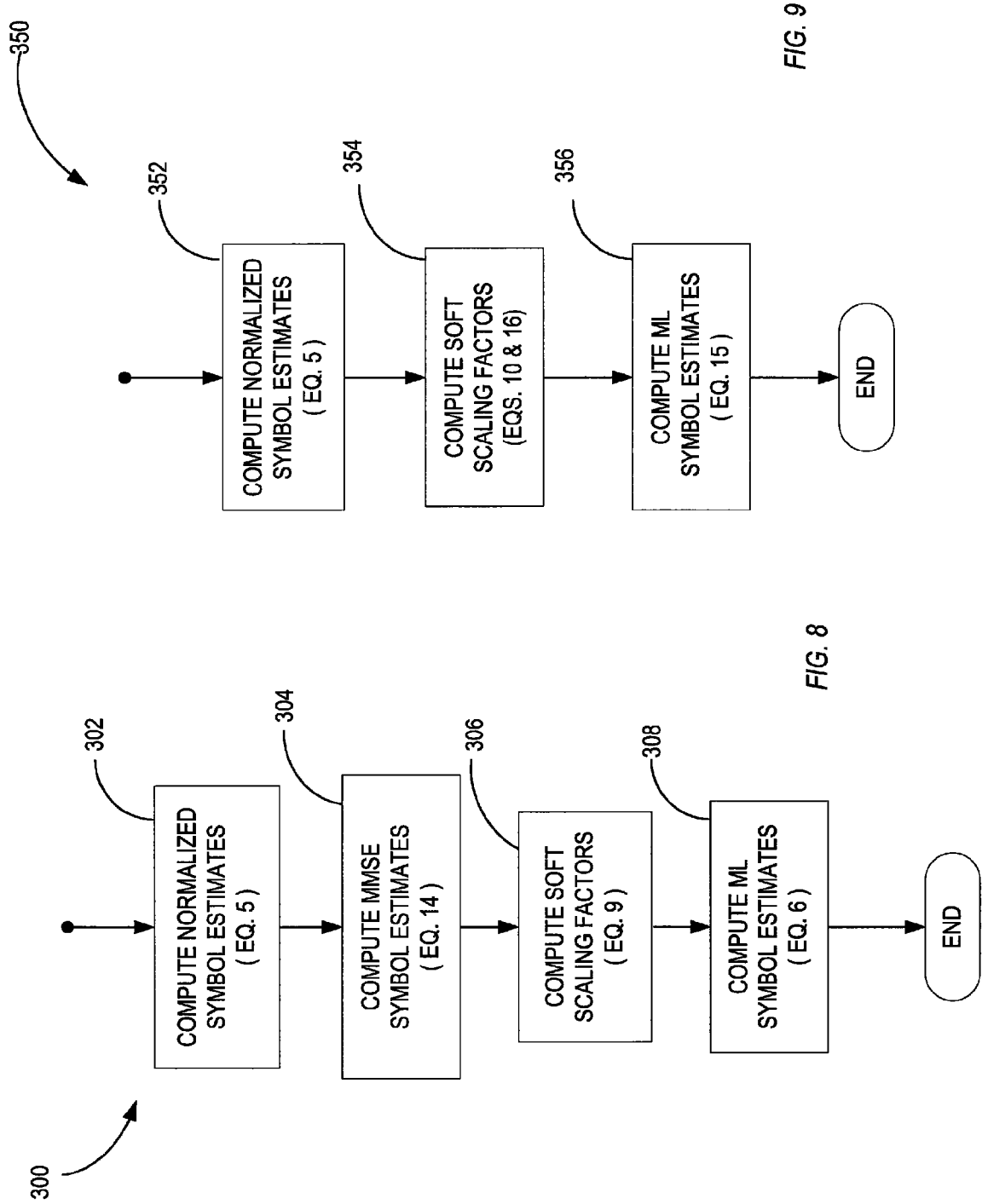

EFFICIENT COMPUTATION OF SOFT SCALING FACTORS FOR LINEAR MULTI-USER DETECTOR

RELATED APPLICATIONS

This application claims priority under 35 U.S.C. §120 as a continuation-in-part of the pending U.S. patent application filed on 24 Apr. 2007 and assigned U.S. patent application Ser. No. 11/739,126, which is entitled "Robust Multicode Detector for HSDPA" and incorporated by reference herein.

BACKGROUND

Interference is one of the biggest challenges to obtaining high data transmission rates in Code Division Multiple Access (CDMA) systems, such as Wideband CDMA and cdma2000. Interference arises in two main ways. First, in dispersive channels, multiple echoes of the transmitted signal arrive at the receiver with different delays. Such dispersion results in Intersymbol Interference (ISI) and Multiple Access Interference (MAI) due to loss of orthogonality between different spreading codes. Second, neighboring cells contribute interference even in non-dispersive channels because the base station long scrambling codes are not orthogonal. In addition to interference, a receiver must contend with noise. The combination of interference and noise, referred to herein as receiver impairment or impairment, degrades performance at the receiver and limits the data rates that can be realized.

Generalized RAKE (G-RAKE) receivers have been developed for suppressing interference and noise. Interference suppression is achieved in a G-RAKE receiver by treating ISI and MAI as colored Gaussian noise. The noise correlation across fingers is then exploited by adapting the finger delays and combining weights. In this way, the orthogonality between user signals may be partially restored. Recently, further improvements in G-RAKE receivers have been proposed for the High Speed Downlink Packet Access (HSDPA) mode of WCDMA that take into account code cross-correlations.

Multi-user detection techniques have also been used to suppress MAI and ISI due to channel dispersion. Various types of multi-user detectors are known. The optimal multi-user detector is a Maximum Likelihood Sequence Estimation (MLSE) detector. However, the complexity of an MLSE detector grows exponentially with the number of users and is therefore not practical to implement. Therefore, there is interest in developing suboptimal detectors that obtain good performance with low complexity.

One suboptimal multi-user detector is the linear Minimum Mean Squared Error (MMSE) detector. Co-pending application Ser. No. 11/739,126 filed 24 Apr. 2007 and titled "Robust Multicode Detector for HSDPA" describes an exemplary MMSE detector for generating MMSE estimates of the received symbols. For proper decoding, it is desirable to scale the MMSE estimates or other initial symbol estimates of the received symbols to yield maximum likelihood (ML) estimates.

SUMMARY

The present invention relates generally to a method and apparatus for computing soft scaling factors to convert initial symbol estimates of received symbols to soft estimates for decoding. The method comprises computing spreading waveform correlations between a spreading waveform for a symbol of interest and spreading waveforms for one or more interfering symbols, computing interference rejection terms by scaling the spreading waveform correlations by corresponding signal powers and compensating for noise, and computing a soft scaling factor for the symbol of interest based on the interference rejection terms. A robust interference model is used to compute the soft scaling factors that avoid numerical problems associated with other known methods. The soft scaling factors are applied to the initial symbol estimates to generate the soft estimates. In some exemplary embodiments, normalized symbol estimates or MMSE symbol estimates are scaled to produce maximum likelihood estimates for decoding.

BRIEF DESCRIPTION OF THE DRAWINGS

FIG. 4 illustrates an exemplary method for computing soft symbol estimates.

FIG. 5 illustrates an exemplary method for computing soft scaling factors,

FIG. 6 illustrates an exemplary method for computing ML symbol estimates from MMSE symbol estimates using an iterative approach.

FIG. 7 illustrates an exemplary method for computing ML symbol estimates from normalized symbol estimates using an iterative approach.

FIG. 8 illustrates an exemplary method for computing ML symbol estimates from MMSE symbol estimate using a matrix inversion approach.

FIG. 9 illustrates an exemplary method for computing ML symbol estimates from MMSE symbol estimate using a matrix inversion approach.

DETAILED DESCRIPTION

Figure 1:
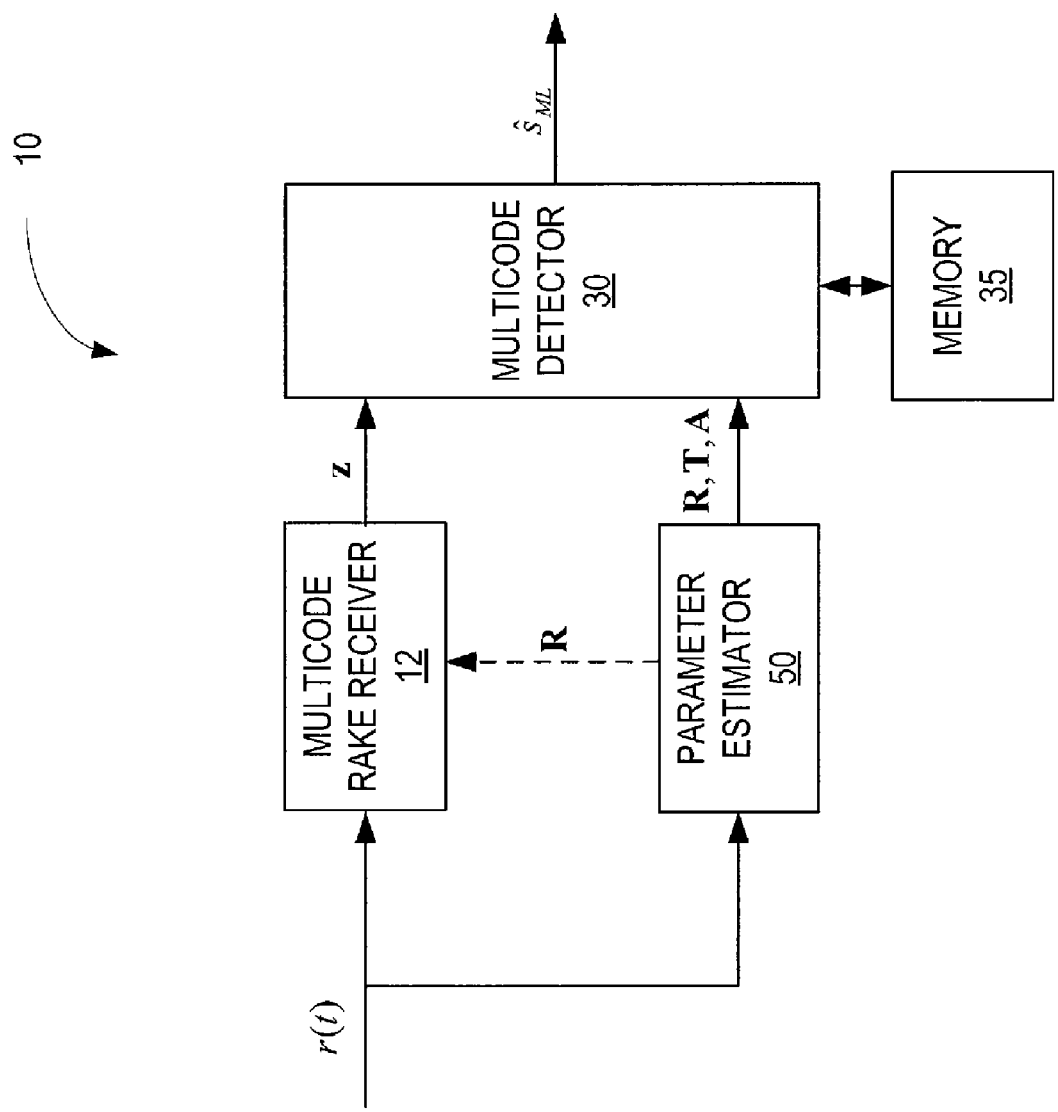
FIG. 1 illustrates an exemplary multicode receiver

Referring now to the drawings, FIG. 1 illustrates a block diagram of a multicode receiver 10 according to one exemplary embodiment for jointly detecting signals in a composite received signal r(t) that has been transmitted on different spreading codes. Receiver 10 comprises a multicode RAKE receiver 12, a multicode detector 30, parameter estimator 50, and memory 35. The multicode RAKE receiver 12 despreads the composite received signal r(t) to generate a vector z of combined values corresponding to each spreading code. The multicode detector 30 jointly detects symbols transmitted on the codes of interest. As will be described more fully below, the multicode detector 30 generates initial symbol estimates of the symbols of interest and scales the initial symbol estimates to obtain soft estimates $\hat{s}_{SOFT}$ for decoding. The initial symbol $\hat{s}_{INITIAL}$ estimates may, for example, comprise normalized symbol estimates $\hat{s}_{NORMAL}$ or MMSE symbol estimates $\hat{s}_{MMSE}$. The soft estimates may comprise Maximum Likelihood (ML) estimates. The parameter estimator 50 estimates parameters used by the multicode detector 30 to generate symbol estimates. The exemplary embodiment of the receiver 10 described is configured for the High Speed Packet Access (HSPA) mode in a Wideband Code Division Multiple Access (WCDMA) system. The receiver 10 may be deployed in a base station or a mobile terminal. Memory 35 may temporarily store computed values as hereinafter described to reduce the computational load on the multicode detector 30.

Figure 2:
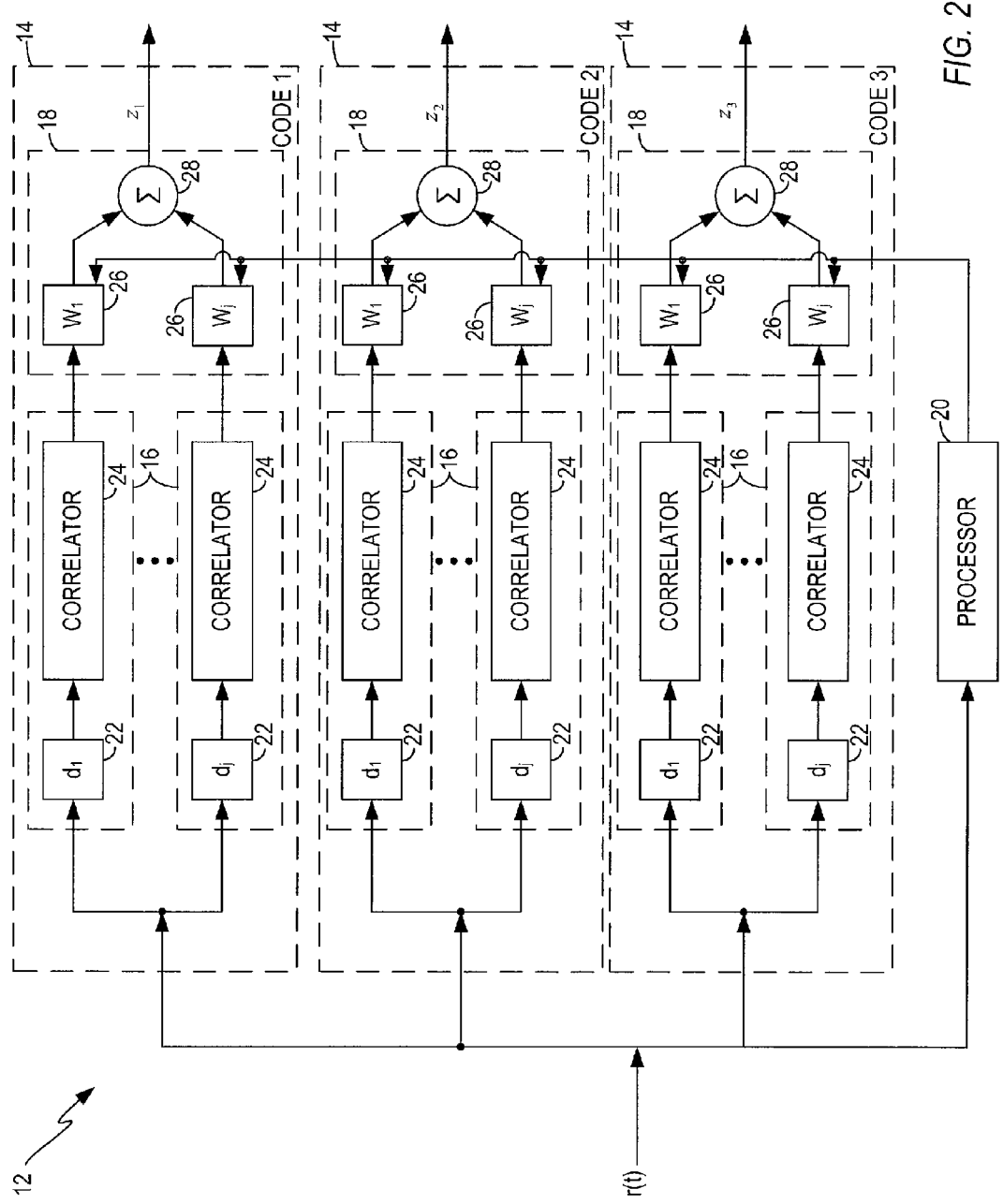
FIG. 2 illustrates an exemplary RAKE receiver for a multicode receiver.

FIG. 2 illustrates the multicode RAKE receiver 12 in more detail. The multicode RAKE receiver 12 may be viewed as a plurality of single code RAKE receivers 14, one for each spreading code. RAKE receivers 14 may comprise conventional RAKE receivers or generalized RAKE (G-RAKE) receivers. Each RAKE receiver 14 comprises a plurality of RAKE fingers 16 and a RAKE combiner 18. The RAKE fingers 16 process different time shifts or multi-path echoes of the received signal r(t). Typically, each RAKE finger 16 comprises a delay element 22 and a correlator or despreader 24. Delay elements 22 delay the received signal r(t) to time align the multi-path echoes processed by each RAKE finger 16. Correlators 24 correlate the delayed signals with a spreading code to extract the assigned multi-path echoes from the received signal r(t). Despread values from correlators 24 are combined in combiner 18. When correlating to multiple scrambled Walsh codes, the correlators 24 associated with a particular delay may be replaced by a shared descrambling operation and a Fast Walsh Transform (FWT).

Combiner 18 typically includes a plurality of weighting elements 26 and a summer 28. Weighting elements 26 weight the despread signals output from respective fingers 16 using combining weights computed by a RAKE processor 20. The combining weights computed by the RAKE processor 20 may comprise conventional RAKE combining weights computed based on the channel coefficients, or G-RAKE combining weights computed based on the channel coefficients and an impairment correlation matrix. The weighted multi-path echoes are summed symbol-by-symbol by summer 28 to form a RAKE combined value during each symbol period. Each RAKE combined value represents a symbol of interest or an interfering symbol. It should be noted that the symbols of interest may interfere with one another. Therefore, when a given symbol of interest is considered, the other symbols of interest may be considered as interfering symbols.

Although the present invention is described in the context of a multicode RAKE receiver, those skilled in the art will recognize that other forms of multicode reception can be used, such as chip equalization.

Figure 3:
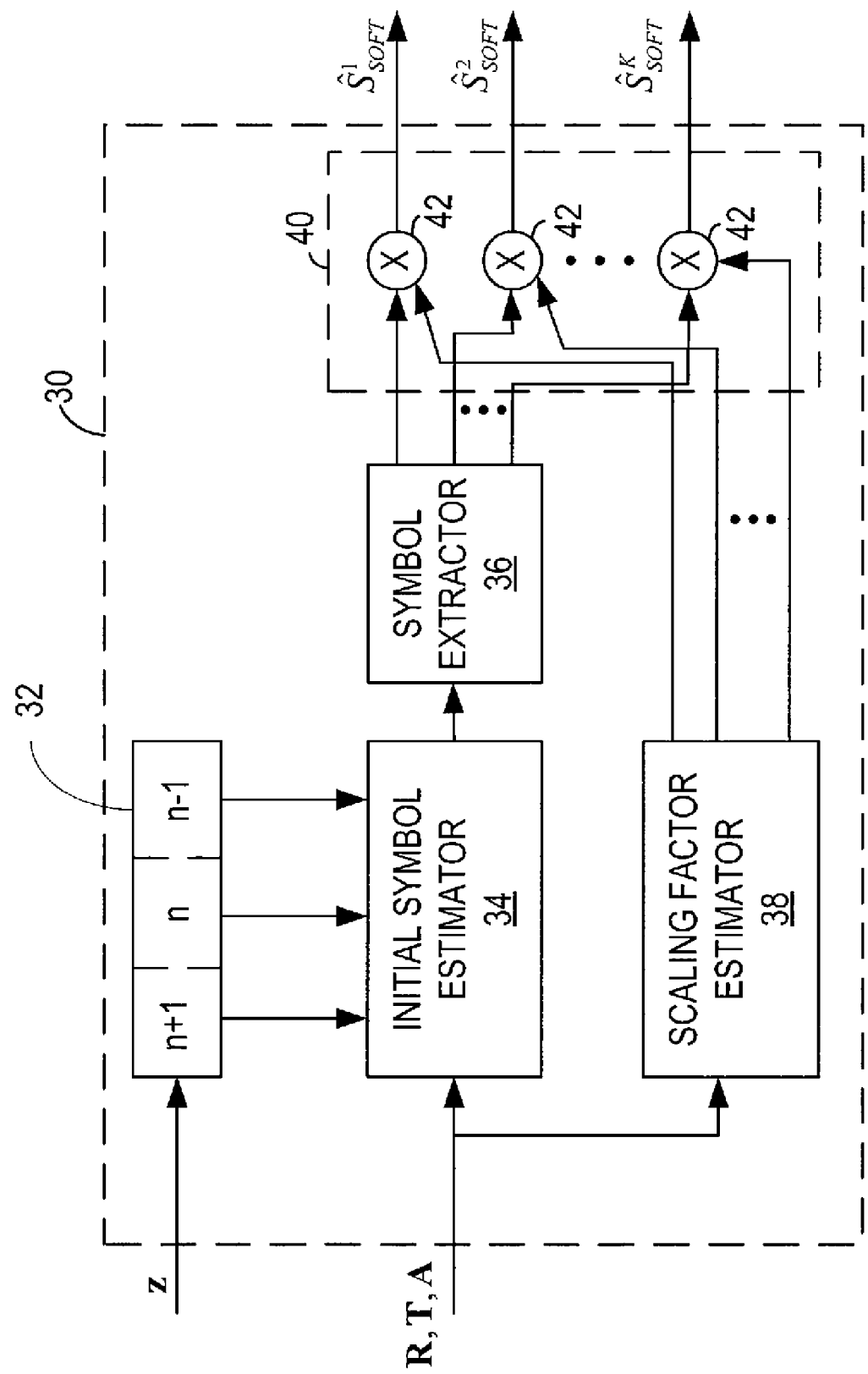
FIG. 3 illustrates an exemplary multicode detector for a multicode receiver.

FIG. 3 illustrates an exemplary multicode detector 30. This exemplary embodiment comprises a sliding window detector. The symbols for K users are jointly detected over 2N+1 symbol periods (K'=(2N+1)K). The "middle" K symbols are of interest to the receiver 10, from which the symbols of interest are extracted and decoded.

The multicode detector 30 comprises a sliding window selector 32, initial symbol estimator 34, symbol extractor 36, soft scaling factor estimator 38, and scaling unit 40. The sliding window selector 32 selects symbols for processing by the initial symbol estimator 34. The initial symbol estimator 34 generates initial symbol estimates of the received symbols, which may include both symbols of interest and interfering symbols. The initial symbol estimator 34 may comprise a conventional Linear Multi-User Detector (LMUD), such as a Minimum Mean Squared Error (MMSE) detector. The symbol extractor 38 extracts initial symbol estimates for the symbols of interest for a current symbol period and outputs the initial symbol estimates to a scaling unit 40. The soft scaling factor estimator 38 computes soft scaling factors that are applied by the scaling unit 40 to scale the initial symbol estimates to generate soft symbol estimates $\hat{s}_{SOFT}$ for decoding.

The multicode receiver 10 operates as follows. The RAKE receiver 12 despreads the received signal to generate a vector of RAKE combined values z. The vector z of RAKE combined values may be modeled as:

$$z = RAs + n, \quad \text{Eq. (1)}$$

where $s = (s_0, \ldots, s_{K-1})^T$ is a vector of symbols to be considered for joint detection, and $A = \text{diag}(A_0, \ldots, A_{K-1})$ is a diagonal matrix with the $k^{th}$ element corresponding to the received amplitude for $s_k$, R is a waveform correlation matrix, and n is a vector of the noise. The vector z includes both symbols of interest and interfering symbols. The elements of R are the cross-correlations of the effective spreading waveforms of the symbols in s with each other and with themselves. The element in R relating the combined value $z_u$ with the symbol $s_v$ is given by:

$$R(u, v) = \int_{-\infty}^{\infty} f_u^H(t) f_v(t) dt, \quad \text{Eq. (2)}$$

where $f_u(t) = [f_{u,0}(t), f_{u,1}(t), \ldots, f_{u,Q-1}(t)]^T$ is the effective waveform for symbol $s_u$, with each element corresponding to each receive antenna q. The number of receive antennas equals Q. The effective spreading waveform considered is a combination of the transmit waveform, radio channel impulse response, and receive filtering, which includes receive chip filtering, despreading, and RAKE combining. It can be demonstrated that $\sigma^2 R$ is the covariance of the noise vector n, where $\sigma^2$ is the noise variance at the input of the RAKE receiver 12.

The vector of RAKE combined values z is input to the multicode detector 30. Given vector z, the initial symbol estimator 34 generates MMSE symbol estimates $\hat{s}_{MMSE}$ or normalized symbol estimates $\hat{s}_{NORMAL}$. MMSE symbol estimates $\hat{s}_{MMSE}$ are given by:

$$\hat{s}_{MMSE} = AT^{-1} z, \quad \text{Eq. (3)}$$

where the matrix T comprises a matrix of interference rejection terms given by:

$$T = RA^2 + \sigma^2 I. \quad \text{Eq. (4)}$$

The matrix A represents a diagonal matrix having signal amplitudes on the diagonal and $\sigma^2$ represents the noise power. Alternatively, the initial symbol estimates $\hat{s}_{INITIAL}$ may comprise normalized symbol estimates $\hat{s}_{NORMAL}$ given by:

$$\hat{s}_{NORMAL} = T^{-1} z. \quad \text{Eq. (5)}$$

The matrix A, waveform correlation matrix R, and interference rejection matrix T are computed by the parameter estimator 50 and input to the multicode detector 30.

Maximum Likelihood (ML) symbol estimates $\hat{s}_{ML}$ may be determined from the MMSE symbol estimates $\hat{s}_{MMSE}$ according to:

$$\hat{s}_{ML} = B \hat{s}_{MMSE}, \quad \text{Eq. (6)}$$

where $B = \text{diag}(B_0, B_1, \ldots, B_{K-1})^T$ is a diagonal matrix with elements given by:

$$B_k = \frac{1}{1 - A_k^2 r_k^H (RA^2 R + \sigma^2 R)^{-1} r_k}. \quad \text{Eq. (7)}$$

The vector $r_k$ is the $k^{th}$ column of matrix R given by Eq. (2), and $()^H$ indicates the conjugate transpose of a matrix/vector. Eqs. (6) and (7) assume a sliding window receiver approach.

Eq. (7) may be simplified in two steps. In the first step, the term $(RA^2R+\sigma^2R)^{-1}$ is rewritten as $R^{-1}(RA^2+\sigma^2I)^{-1}=R^{-1}T^{-1}$ to give:

$$B_k = \frac{1}{1 - A_k^2 r_k^H R^{-1} T^{-1} r_k}. \quad \text{Eq. (8)}$$

There are two ways in which Eq. (8) may be further simplified. First, it may be observed that $r_k^H R^{-1} T^{-1} r_k$ may be reduced to $u_k^H r_k$, where $u_k^H$ is the $k^{th}$ row of matrix $U=T^{-1}$. Applying this simplification in a second step, the diagonal elements of the B matrix become:

$$B_k = \frac{1}{1 - A_k^2 u_k^H r_k}. \quad \text{Eq. (9)}$$

Alternatively, a portion of Eq. (8) may be recast in terms of a system of linear equations of the form $Px=b$ as a second simplification step. Using this framework, define $$Tt_k = r_k, \quad \text{Eq. (10)}$$

so that Eq. (8) may be written as:

$$B_k = \frac{1}{1 - A_k^2 r_k^H R^{-1} t_k}. \quad \text{Eq. (11)}$$

It may be observed that the term $r_k^H R^{-1}$ in Eq. (11) is simply a row vector filled with zeros except for a 1 in the $k^{th}$ position. Using this fact, Eq. (11) simplifies to:

$$B_k = \frac{1}{1 - A_k^2 t_{k,k}}, \quad \text{Eq. (12)}$$

where $t_{k,k}$ indicates the $k^{th}$ element of vector $t_k$.

The soft scaling factor estimator 38 computes the soft scaling factors. Several different approaches may be employed to compute B in Eq. (6). A first approach, referred to herein as the inversion approach, relies on the ability to invert the interference rejection matrix T to obtain $u_k^H$ in Eq. (9). This inversion may be performed using LU decomposition, QR decomposition, Cholesky factorization, or other standard means. Note that the inversion approach is also applicable to Eqs. (11) and (12) since $t_k = T^{-1} r_k$.

A second approach to computing soft scaling factors is referred to herein as the iterative approach. This approach relies on the fact that $Px=b$ may be efficiently solved using iterative linear systems solvers like Gauss-Seidel, Gauss-Jordan, and/or conjugate gradient iterations provided that matrix P has certain properties. Thus, the soft scaling factor $B_k$ for the symbol estimate associated with the $k^{th}$ code may be computed by iteratively solving Eq. (10) for $t_k$ and substituting the result into either Eq. (11) or (12).

FIG. 4 illustrates an exemplary procedure 100 for computing ML symbol estimates $\hat{s}_{ML}$. First, initial symbol estimates $\hat{s}_{INITIAL}$ are computed (block 102). Next, soft scaling factors are computed as described in further detail below. Finally, the soft scaling factors are used to scale the initial symbol estimates $\hat{s}_{INITIAL}$ to obtain soft symbol estimates $\hat{s}_{SOFT}$ according to Eq. (6) (block 106).

The initial symbol estimates $\hat{s}_{INITIAL}$ may comprise normalized symbol estimates $\hat{s}_{NORMAL}$ or MMSE symbol estimates $\hat{s}_{MMSE}$. Normalized symbol estimates $\hat{s}_{NORMAL}$ may be computed according to:

$$T\hat{s}_{NORMAL} = z. \quad \text{Eq. (13)}$$

Eq. (13) may be solved iteratively for $\hat{s}_{NORMAL}$ using linear systems solvers like Gauss-Seidel, Gauss-Jordan, and/or conjugate gradient algorithms. If MMSE symbol estimates are desired, the MMSE symbol estimates $\hat{s}_{MMSE}$ may be computed from the normalized symbol estimates $\hat{s}_{NORMAL}$ according to:

$$\hat{s}_{MMSE} = A\hat{s}_{NORMAL}. \quad \text{Eq. (14)}$$

FIG. 5 illustrates an exemplary procedure 150 for computing soft scaling factors (block 104 in FIG. 4). The procedure 150 shown in FIG. 5 applies to both the iterative and matrix inversion approaches. First, spreading waveform correlations (elements in matrix R) are computed according to Eq. (2) (block 152). The spreading waveform correlation matrix R is then used to compute interference rejection terms (elements in matrix T) according to Eq. (4) (block 154). The interference rejection matrix T is computed according to Eq. (4) by scaling the spreading waveform correlations in R by corresponding signal powers (elements in $A^2$) and compensating for noise. The interference rejection terms are then used to compute the soft scaling factors $B_k$ for the symbols of interest (block 156). For either soft scaling computation approach, the soft scaling factors may be computed according to Eq. (10) and either Eq. (11) or (12). Alternatively, the soft scaling factors may be computed according to Eq. (9) using the matrix inversion approach.

In some embodiments of the invention, the computation of MMSE symbol estimates $\hat{s}_{MMSE}$ from normalized symbol estimates $\hat{s}_{NORMAL}$ may be combined with the computation of soft scaling factors. Eq. (14) gives the relationship between MMSE symbol estimates $\hat{s}_{MMSE}$ and normalized symbol estimates $\hat{s}_{NORMAL}$. The matrices A in Eq. 14 and B in Eq. (6) are both diagonal matrices. Thus, ML symbol estimates $\hat{s}_{ML}$ may be computed directly from normalized symbol estimates $\hat{s}_{NORMAL}$ according to:

$$\hat{s}_{ML} = D\hat{s}_{NORMAL}, \quad \text{Eq. (15)}$$

where the diagonal elements of the matrix D are given by:

$$D_K = \frac{A_K}{1 - A_k^2 t_{k,k}}. \quad \text{Eq. (16)}$$

It may be observed that $D_K$ in Eq. (16) equals a scaled form of $B_K$ in Eq. (12).

FIG. 6 illustrates an exemplary procedure 200 for computing ML symbol estimates $\hat{s}_{ML}$ from MMSE symbol estimates $\hat{s}_{MMSE}$ using the iterative approach for computing soft scaling factors. Normalized symbol estimates are computed from Eq. (13) (block 202) and then MMSE symbol estimates $\hat{s}_{MMSE}$ are computed from Eq. (14) (block 204). The MMSE symbol estimates $\hat{s}_{MMSE}$ are used as initial symbol estimates. The soft scaling factors (diagonal elements of B) are computed by solving Eq. (10) and then selecting the appropriate elements of $t_k$ to use in solving Eq. (12) (block 206). This step is performed for each code of interest. For example, if a given user of interest is assigned 5 codes, block 206 would be performed 5 times; once for each code assigned to the user. Finally, the MMSE symbol estimates $\hat{s}_{MMSE}$ are converted to ML symbol estimates $\hat{s}_{ML}$ according to Eq. (6) (block 208).

FIG. 7 illustrates an exemplary procedure 250 for computing ML symbol estimates $\hat{s}_{ML}$ from normalized symbol estimates $\hat{s}_{NORMAL}$ using the iterative approach for computing soft scaling factors. Normalized symbol estimates are computed from Eq. (13) (block 252). The normalized symbol estimates $\hat{s}_{NORMAL}$ are used as initial symbol estimates $\hat{s}_{INITIAL}$. The matrix D is then computed by solving Eq. (10) for $t_k$ and then selecting the appropriate elements $t_{k,k}$ in $t_k$ to use in solving Eq. (16) (block 254). This step is performed for each code of interest. Finally, the normalized symbol estimates $\hat{s}_{NORMAL}$ are converted to ML symbol estimates $\hat{s}_{ML}$ according to Eq. (15) (block 256).

FIG. 8 illustrates an exemplary procedure 300 for computing ML symbol estimates $\hat{s}_{ML}$ from MMSE symbol estimates $\hat{s}_{MMSE}$ using the matrix inversion approach for computing soft scaling factors. Normalized symbol estimates $\hat{s}_{NORMAL}$ are computed from Eq. (5) (block 302) and then MMSE symbol estimates $\hat{s}_{MMSE}$ are computed from Eq. (14) (block 304). The MMSE symbol estimates $\hat{s}_{MMSE}$ are used as initial symbol estimates. The soft scaling factors (diagonal elements of B) are computed by solving Eq. (9) (block 306). This involves inverting matrix T and storing the inverse in memory 35 to reuse with different codes of interest. This step is performed for each code of interest. Finally, the MMSE symbol estimates $\hat{s}_{MMSE}$ are converted to ML symbol estimates $\hat{s}_{ML}$ according to Eq. (6) (block 308).

FIG. 9 illustrates an exemplary procedure 350 for computing ML symbol estimates $\hat{s}_{ML}$ from normalized symbol estimates $\hat{s}_{NORMAL}$ using the matrix inversion approach for computing soft scaling factors. Normalized symbol estimates are computed from Eq. (5) (block 352). The normalized symbol estimates $\hat{s}_{NORMAL}$ are used as initial symbol estimates $\hat{s}_{INITIAL}$. The soft scaling factors (matrix D) are then computed by computing the elements $t_{k,k}$ for each code of interest (block 354) using $t_k = T^{-1} r_k$ and Eq. (16). This involves inverting matrix T and storing the inverse in memory to reuse with different codes of interest. Finally, the normalized symbol estimates $\hat{s}_{NORMAL}$ are converted to ML symbol estimates $\hat{s}_{ML}$ according to Eq. (15) (block 356).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a symbol detector of a receiver for detecting a symbol of interest in a received signal, said method comprising:
   determining initial estimates for a symbol of interest and one or more interfering symbols;
   computing spreading waveform correlations between a spreading waveform for the symbol of interest and spreading waveforms for one or more interfering symbols;
   computing interference rejection terms by scaling said spreading waveform correlations by corresponding signal powers and compensating for noise;
   using the symbol detector, computing a soft scaling factor for said symbol of interest based on said interference rejection terms, by iteratively solving a system of linear equations formed from a matrix of said interference rejection terms; and
   using the symbol detector, determining a soft estimate from said initial estimate for said symbol of interest by scaling said initial estimate for said symbol of interest by said soft scaling factor.

2. The method of claim 1 wherein determining initial estimates for the symbol of interest and one or more interfering symbols comprises despreading the received signal to generate despread values, combining said despread values to generate RAKE combined values, and processing said RAKE combined values to generate said initial estimates.

3. The method of claim 1 wherein said initial estimates comprise normalized symbol estimates.

4. The method of claim 1 wherein said initial estimates comprise Minimum Mean Squared Error (MMSE) symbol estimates.

5. The method of claim 1 wherein said soft scaling factor is computed by inverting a matrix of said interference rejection terms.

6. The method of claim 5 further comprising storing the inverted matrix computed for a first code of interest and applying said stored matrix to compute a soft scaling factor for a second code of interest.

7. The method of claim 5 wherein inverting a matrix of said interference rejection terms comprises one of LU decomposition, QR decomposition, or Cholesky factorization.

8. A symbol detector for a receiver comprising:
   an initial symbol estimator to determine an initial estimate for a symbol of interest and one or more interfering symbols;
   a correlation estimator to compute spreading waveform correlations between a spreading waveform for the symbol of interest and spreading waveforms for one or more interfering symbols;
   an interference estimator to compute interference rejection terms by scaling said spreading waveform correlations by corresponding signal powers and compensating for noise;
   a scaling factor estimator to compute a soft scaling factor for said symbol of interest based on said interference rejection terms, by iteratively solving a system of linear equations formed from a matrix of said interference rejection terms; and
   a scaling unit to scale said initial estimate for said symbol of interest by said soft scaling factor to determine a soft symbol estimate for decoding.

9. The symbol detector of claim 8 further comprising a RAKE receiver to despread a received signal to generate despread values and to combine said despread values to generate RAKE combined values for input to aid initial symbol estimator.

10. The symbol detector of claim 8 wherein said initial symbol estimator generates normalized symbol estimates.

11. The symbol detector of claim 8 wherein said initial symbol estimator generates Minimum Mean Squared Error (MMSE) symbol estimates.

12. The symbol detector of claim 8 wherein said scaling factor estimator computes the soft scaling factor by inverting a matrix of said interference rejection terms.

13. The symbol detector of claim 12 wherein said symbol detector further comprises memory to store said inverted matrix computed for a first code of interest to use in computing a soft scaling factor for a second code of interest.

14. The symbol detector of claim 12 wherein said scaling factor estimator inverts a matrix of said interference rejection terms using one of LU decomposition, QR decomposition, or Cholesky factorization.

* * * * *

UNITED STATES PATENT AND TRADEMARK OFFICE
CERTIFICATE OF CORRECTION

PATENT NO. : 8,295,329 B2
APPLICATION NO. : 11/850837
DATED : October 23, 2012
INVENTOR(S) : Cairns et al.

Page 1 of 1

It is certified that error appears in the above-identified patent and that said Letters Patent is hereby corrected as shown below:

In Column 8, Line 46, in Claim 9, delete "aid" and insert -- said --, therefor.

Signed and Sealed this
Twenty-sixth Day of February, 2013

Teresa Stanek Rea
*Acting Director of the United States Patent and Trademark Office*